United States Patent [19]

Shafer

[11] 4,074,692
[45] Feb. 21, 1978

[54] PIPELINE BREAK SHUTOFF CONTROL

[76] Inventor: Homer J. Shafer, 2300 Park Ave. West, Mansfield, Ohio 44906

[21] Appl. No.: 189,613

[22] Filed: Oct. 15, 1971

[51] Int. Cl.[2] ........................................... F16K 17/00
[52] U.S. Cl. .................................. 137/488; 137/460; 137/487
[58] Field of Search .............. 137/458, 459, 460, 488, 137/464, 498, 487

[56] References Cited

U.S. PATENT DOCUMENTS

| 2,836,192 | 5/1958 | Shafer | 137/488 |
| 2,849,987 | 9/1958 | Shafer | 91/461 |
| 2,943,636 | 7/1960 | Reed | 137/460 X |
| 3,252,476 | 5/1966 | Page | 137/458 |
| 3,434,493 | 3/1969 | Owens | 137/460 |
| 3,612,081 | 10/1971 | Williams | 137/460 |
| 3,628,563 | 12/1971 | Tomita | 137/460 |

*Primary Examiner*—Harold W. Weakley
*Attorney, Agent, or Firm*—Hamilton, Renner & Kenner

[57] ABSTRACT

A pipeline shutoff control actuated by movement of a pressure responsive element connected to the pipeline and having a predetermined restraining force applied thereto, said restraining force adapted to release said element in response to a predetermined rate of pressure drop in said pipeline whereby to actuate said control.

4 Claims, 4 Drawing Figures

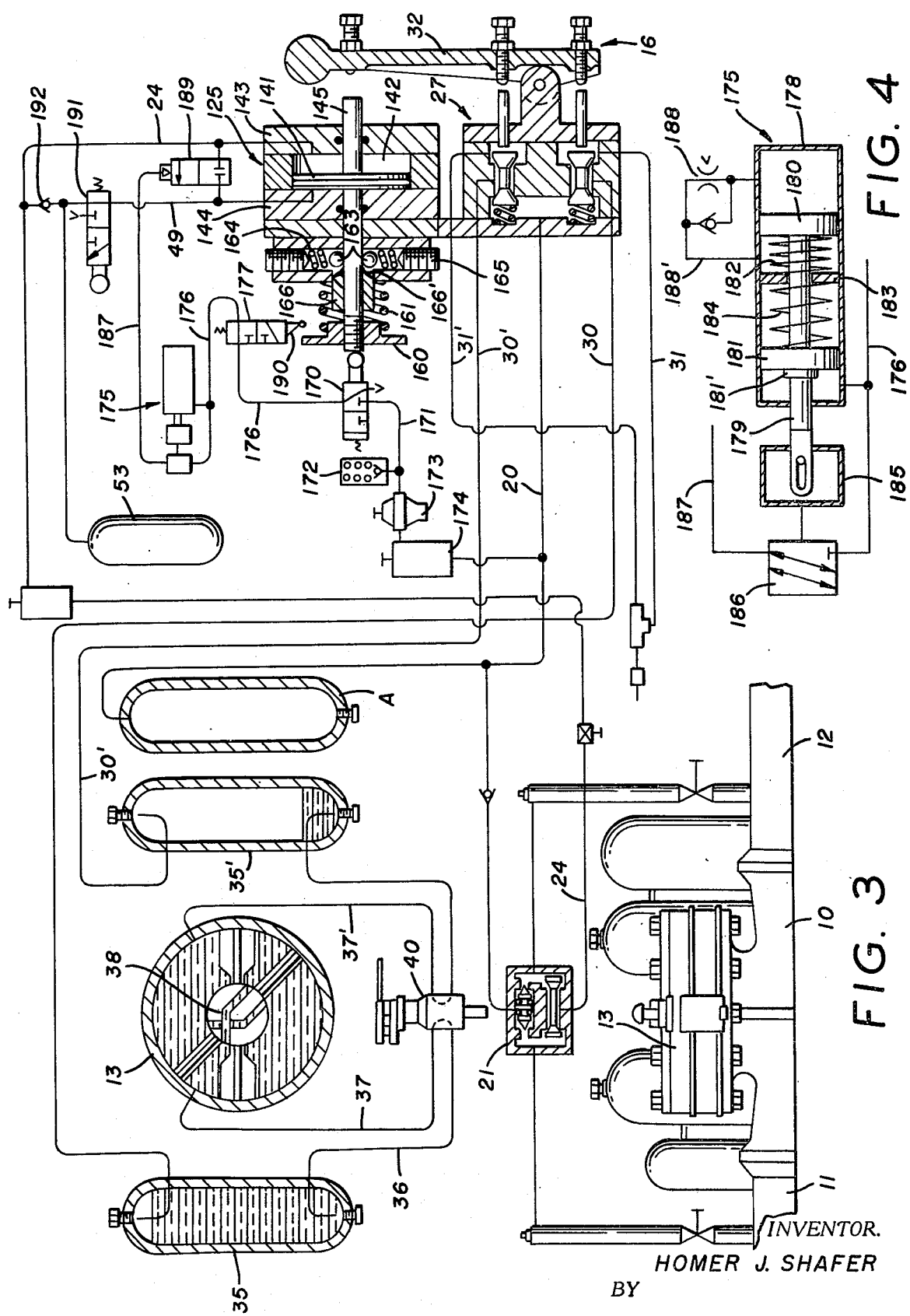

PIPELINE BREAK SHUTOFF CONTROL

BACKGROUND OF THE DISCLOSURE

In large pipelines transporting fuel fluids it is very important to provide safe, reliable and automatic controls in the event of a line break or serious leak, for operating shutoff valves in main lines, by-pass lines, crossover lines, river-crossing lines, off-shore lines, and the like.

Certain prior line break controls utilize a complicated system comprising differential relay valves, diverter valves, check valves and holding tanks, with an adjustable timing relay valve for adjusting the time delay after a substantial pressure drop before the system operates to actuate the valve shutoff control. Such complicated systems are quite expensive.

Certain other conventional line break controls utilize a piston or diaphragm as a pressure responsive element to actuate the valve shutoff control, the main line being connected directly to one side of the pressure responsive element and through a reduced orifice to the other side and to a pressure tank which actuates the element due to a severe drop in the direct connection. Such a control is disclosed in my prior U.S. Pat. No. 2,849,987. These controls rely on a lost motion connection between the diaphragm and the shutoff control to absorb normal pressure fluctuations without actuating the control, and are operated by an amount of pressure drop as related to an estimated rate of pressure change, rather than by an actual rate of pressure drop. A pressure drop sufficient to operate this type of shutoff control may be caused by conditions other than a line break under which it may not be desired to shut off the main valve.

Moreover, this type of shutoff control is not very reliable or accurate because the compressibility of the high pressure gas in the system tends to cause fluctuations of the pressure responsive element which may cause operation of the control lever when not desired.

SUMMARY OF THE INVENTION

It is an object of the present invention to provide an improved pipeline valve control operated in response to a predetermined rate of pressure drop in the pipeline.

Another object is to provide an improved pipeline valve control which does not rely on a lost motion connection to absorb normal pipeline fluctuations in a pressure without operating the control, and which operates positively with a snap action.

A further object is to provide an improved pipeline valve control which is extremely simple and inexpensive.

A still further object is to provide an improved pipeline valve control in which the predetermined rate of pressure drop necessary to operate the control is easily adjusted to suit various conditions.

These and other objects may be accomplished by connecting the main pipeline directly to one side of a pressure movable element such as a diaphragm and connecting the pipeline to the other side of said element and to a pressure tank, utilizing an orifice to time the rate of differential buildup on opposite sides of the diaphragm, and applying a predetermined amount of force to the element restraining its movement in a direction to operate the valve control.

DESCRIPTION OF THE DRAWINGS

FIG. 3 is a similar schematic view of another embodiment of the improved shutoff control embodying a pneumatic timing relay valve.

FIG. 4 is an enlarged schematic view of the pneumatic timing relay valve.

DESCRIPTION OF PREFERRED EMBODIMENTS

Figure 1:
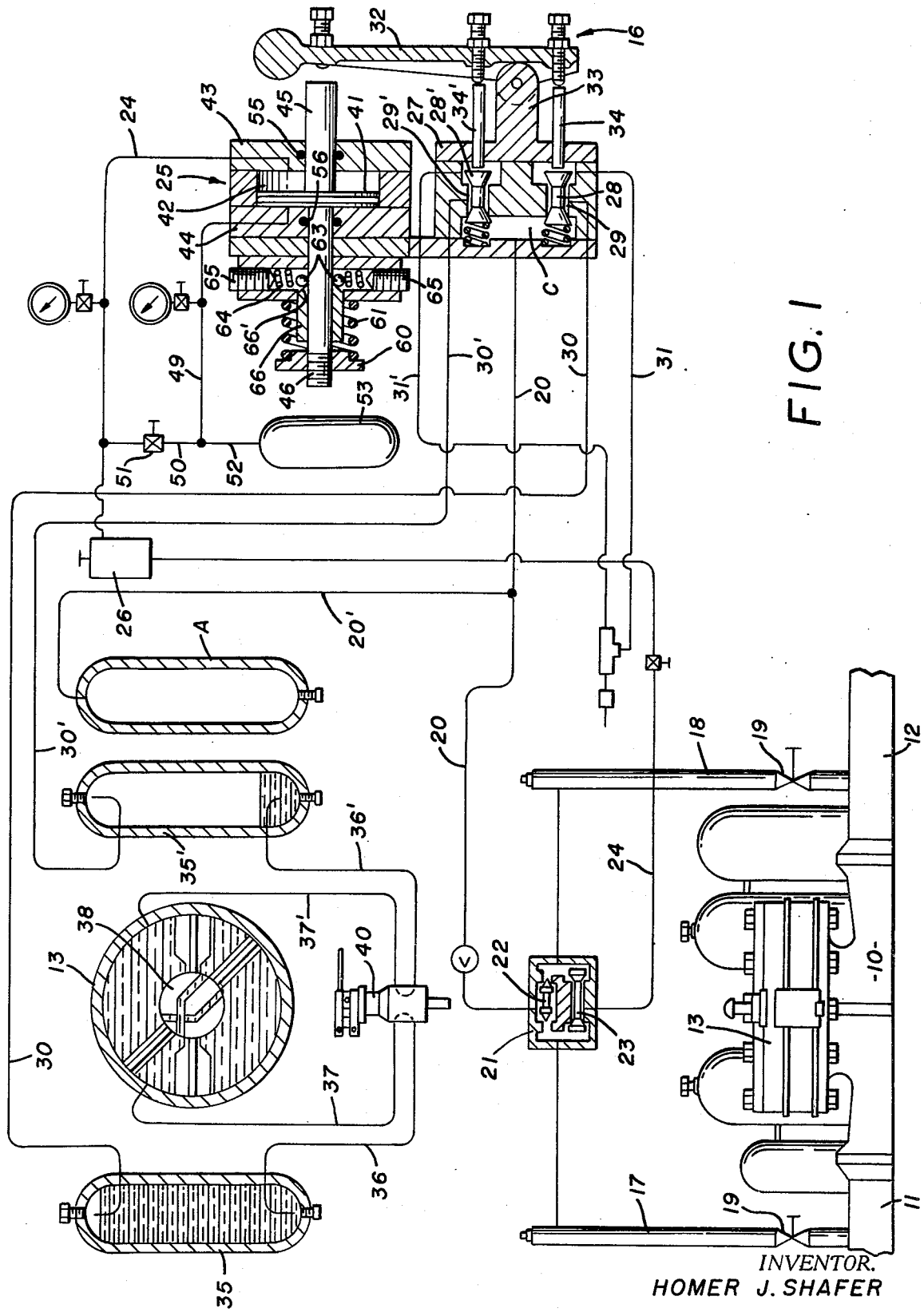
FIG. 1 is a schematic view showing a preferred embodiment of the improved shutoff control connected to a pipeline for controlling the flow to a rotary hydraulic motor powered by the pipeline pressure for closing the main valve in case of a predetermined rate of pressure drop.

Referring first to the embodiment of FIG. 1, the shutoff valve 10 in the main pipeline is connected between the upstream section 11 and downstream section 12, and a conventional rotary hydraulic motor operator 13, shown schematically in cross section, is mounted on top of the valve. The pipeline is connected to the improved control unit indicated generally at 16 and the control unit is connected to the motor 13 in a manner to be described.

Preferably, tap lines 17 and 18 from pipeline sections 11 and 12 have shutoff valves 19 therein and are both connected to a power supply line 20 which is connected to the control 16, so that power is supplied from the high pressure side of the pipeline in the event of failure of pressure on the other side. The tap lines 17 and 18 are connected to opposite sides of a housing 21 having a double check valve 22 therein for directing flow from the pipeline on the high pressure side of valve 10 into power line 20. The power line 20 may be connected by a conduit 20' to a power storage tank A. The housing 21 also encloses a shuttle valve 23 for connecting the low pressure side of the pipeline to conduit 24 which connects to a pressure responsive element indicated generally at 25 for operating the control unit 16. A conventional filter-dryer 26 is preferably connected into line 24.

Thus, if there is a differential pressure in the pipeline sections 11 and 12, the higher pressure will open the double check valve 22 to connect the high pressure on that side to power line 20 while closing the check valve to the low pressure side. At the same time the shuttle valve 23 will connect the low pressure side to conduit 24 and close it off from the high pressure side.

The power supply line 20 is connected to the pressure chamber C of a reversing poppet valve 27 which is part of control unit 16. Double-headed poppet valves 28 and 28' are movably mounted in ports 29 and 29' for connecting the chamber C selectively with one of the conduits 30 or 30' leading to the hydraulic motor 13, and connecting the other line returning from the motor to exhaust line 31 or 31'.

A handle 32 for actuating the poppet valves is pivoted on an arm 33 on the housing of valve 27, and the handle is rocked to selectively actuate rods 34 and 34' to operate the poppet valves 28 and 28'. If the pipeline valve 10 is open and rod 34 is depressed to connect conduit 30 to the pressure chamber C, pressure fluid will flow through conduit 30 to the upper end of cylinder 35 and force the oil contained therein through conduits 36 and 37 to the pressure side of the rotor 38 of the hydraulic motor 13 to rotate the rotor clockwise and close the pipeline valve 10. As the rotor rotates, oil exhausts from the motor through conduits 37' and 36' in the cylinder 35' which exhausts the fluid therein through conduit 30' to valve 16 where it is connected by poppet valve 28' to exhaust line 31'. A hand pump 40 is preferably connected into conduits 37 and 37' for manually operating the rotor 38.

The outer end of handle 32 is arranged to be actuated by the pressure responsive element 25 which may comprise a control piston 41 movable in chamber 42 formed between housing sections 43 and 44. Preferably, the shaft 45 attached to the piston 41 and extending through front housing section 43 is somewhat larger in diameter than the piston shaft 46 extending through the rear housing section 44, for a purpose to be described. Obviously, a flexible diaphragm could be used in place of piston 41.

The front side of the piston chamber 42 is connected to the conduit line 24 which supplies fluid pressure through the shuttle valve 23 from the pipeline on the low pressure side of the valve 10. The rear side of the piston chamber 42 is connected to conduit line 49 which is connected by a line 50 through an adjustable restricted orifice 51 back to conduit 24. The line 49 is also connected by a line 52 to an expansion or pressure tank 53.

Accordingly, when pipeline valve 10 is open and pressure is substantially the same on both sides of the valve, the conduit 24 supplies fluid pressure to the front side of the piston, and conduits 50 and 49 supply the same fluid pressure through orifice 51 to the rear side of the piston so that the pressure on both sides is substantially balanced to hold the piston in the neutral position shown in FIG. 1.

Suitable O-ring seals 55 and 56 are provided around the piston shafts 45 and 46 within housing sections 43 and 44. The shaft 46 projects rearwardly of the housing section 44 and its rear end has screwed thereon a takeup washer 60 urged rearwardly by a compression spring 61, so that when the pressure on both sides of the piston is substantially balanced the spring 61 holds the piston element 41 against the rear side of the chamber 42.

A detent mechanism is applied to the rear portion of shaft 46 to exert a predetermined amount of restraining force holding the shaft against forward movement which will actuate the handle 32 controlling the poppet valve 16 which operates the hydraulic motor 13 for the main pipeline valve 10. The detent mechanism preferably comprises a plurality of ball detents 63 biased radially inward against shaft 46 by springs 64 backed up by adjusting screws 65 for applying a predetermined force to the detents. An abutment sleeve 66 is secured to shaft 46 and its front end has a tapered cam surface 66' normally engaging the ball detents to restrain forward axial movement of the shaft and to release the shaft with a snap action when the predetermined restraining force is overcome. Thus the sleeve acts as a latch to hold the balls until the force required to release the shaft is built up.

When pressure in line 24 decreases rapidly due to a line break the pressure on the front side of piston 41 decreases accordingly, and the pressure in line 49 from expansion tank 53 on the rear side of the piston temporarily maintains an increasing pressure differential on the piston as controlled by the relatively slow escape or retarded flow of fluid pressure through the adjustable orifice 51. When the pressure differential reaches the predetermined value determined by detents 63 it will overcome the restraining force of the detents and positively move the shaft 46 forwardly with a snap action to actuate handle 32.

It is very important to move the shaft positively and with a snap action when released by the detents, as otherwise a more gradual movement such as caused by a compression spring alone could result in failure to actuate the control handle properly due to the compressibility of the fluid medium in the system and the fluctuations in the pressure thereof. Thus the detents act to prevent improper actuation of the control handle due to pressure fluctuations in the system.

The rate of pressure drop in the line is the proper measure of a serious failure such as a line break, and the rate of pressure drop is measured by the rate of escape of pressure fluid from tank 53 through orifice 51 as related to the predetermined pressure differential on the piston necessary to overcome the detents. In other words, if, for example, it is desired to have the piston actuate the handle 32 when a pressure drop of 20 p.s.i. from normal operating line pressure occurs in 1 minute or less, the orifice 51 acts as a timer in combination with the restraining force of the detents to accomplish this result. By varying the size of the orifice or the compression of the detent springs 64, or both, the predetermined rate of pressure drop in line 24 necessary to actuate the piston can be varied as desired.

If the rate of pressure drop is not sufficient to overcome the restraining force of the detents before the pressure differential is decreased by the retarded flow through the orifice 51, the pressure on both sides of the piston again become substantially balanced at a lower pressure. If the line pressure continues to drop, a pressure differential will again be built up and whether it reaches the predetermined value for tripping the detents will again be controlled by the rate of flow through the orifice. Presumably, if the pressure drop is caused by a temporary condition other than a line break, once the condition is corrected, the balanced pressure supplied to the piston will return to normal.

However, as the operating pressure in the line is reduced the rate of flow of pressure fluid from tank 53 through orifice 51 decreases and changes the timing rate accordingly. This means that a shorter time is required for the same pressure differential to actuate the piston even though the rate of pressure drop in the line is constant. In other words, for the same rate of pressure drop the control becomes more sensitive or more apt to operate at lower line pressures.

By providing the piston shaft 46 with a somewhat smaller diameter than the piston shaft 45, the timing rate and the sensitivity of the control may be maintained substantially constant even though the line pressure changes substantially. This is because the differential area on opposite sides of the piston has a greater effect upon the differential pressure at high line pressures than at low line pressures which compensates for the slower rate of flow through orifice 51 at lower line pressures. For example, if the difference in area of opposite sides of the piston makes a difference of pressure of 100 lbs. at 1000 lbs. line pressure, the difference in pressure at 500 lbs. line pressure will be only 50 lbs., thereby compensating for the slower rate of escape through orifice 51 at 500 lbs. pressure.

Accordingly, the sensitivity of the control may be maintained substantially constant at varying line pressures by providing differential areas on opposite sides of the piston.

After the handle 32 has been actuated as by a line break to operate the rotor 38 and close the main valve 10 and the line break has been repaired, the handle may be manually reversed to reopen the valve. If desired, an automatic reopening system, somewhat similar to that shown in my prior U.S. Pat. No. 2,836,192, may be used to reopen the valve 10 in case of false closure of the main valve accidentally or by an unauthorized person. Such a system is shown in FIG. 2.

Figure 2:
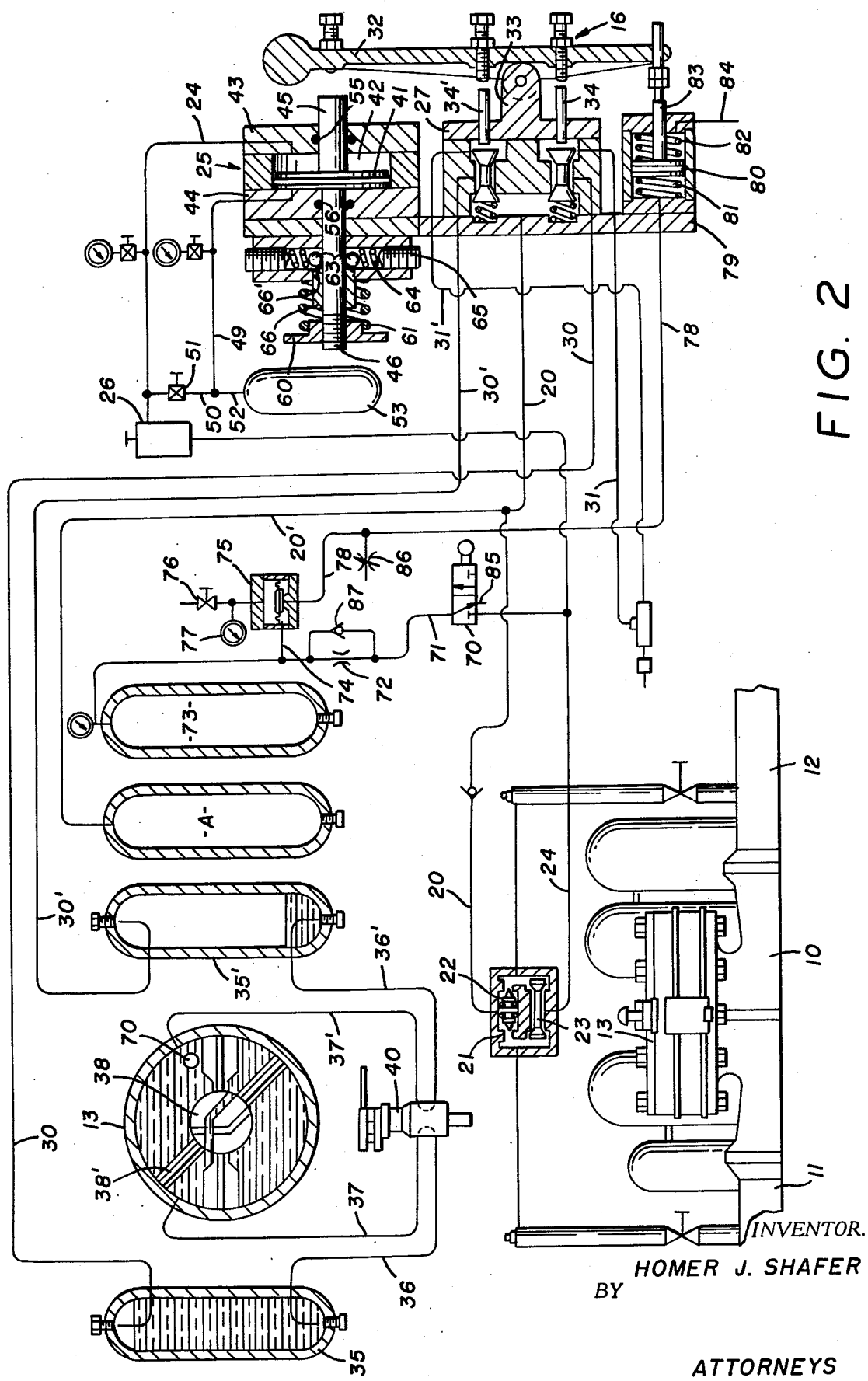
FIG. 2 is a similar schematic view of the embodiment of FIG. 1 with means for automatically opening the main valve in case of false closure thereof.

In FIG. 2 like parts are numbered identical to those in FIG. 1. The automatic reopening system added to FIG. 1 includes a normally closed trigger valve 70 which is preferably mounted on the rotary hydraulic motor 13 in position to be actuated by the vane 38' of the rotor 38 at the end of its closing stroke, said position being indicated schematically in the plan view of the motor 13. The valve 70 is connected in a line 71 leading from line 24 through a reduced orifice 72 to a reopening pressure storage tank 73. Between the tank 73 and the orifice 72 the line 71 is connected by line 74 to one side of a diaphragm type relief regulator valve 75, the other side being connected to a pressure loading valve 76 with a gauge 77 on the connecting line.

The side of regulator valve 75 which is connected to line 71 is also connected by a line 78 to one end of a piston actuator cylinder 79 having a piston 80 therein and springs 81 and 82 on opposite sides of the piston normally maintaining it in neutral position. The opposite side of the piston has an actuating rod 83 thereon which is operatively connected to the end of handle 32 opposite to its normal operating end. The end of cylinder 79 through which rod 83 passes has an exhaust vent 84.

When the main valve 10 is closed by the hydraulic motor operator 13, the vane 38' actuates and opens the trigger valve 70, connecting line 71 to line 24. Through the operation of shuttle valve 23, line 24 is always connected either to the line 11 or 12 on the low pressure side of valve 10. If there has been a line break there is no pressure in line 24, but if there has been a false closure of valve 10 for any reason and there is still pressure in line 24, pressure fluid will flow through line 71 and orifice 72 to fill tank 73 at a predetermined rate. The relief regulator 75 is set to require a desired pressure to open the regulator valve and connect lines 74 and 78, but if the pressure on the low side of main valve 10 should drop rapidly because of a line break after closing the main valve, the pressure in tank 73 will not build up sufficiently to open relief regulator 75. When relief regulator 75 opens, lines 74 and 78 connect the tank 73 to actuator 79 which actuates handle 32 to reverse the flow through poppet valve 27, line 30', tank 35' and lines 36' and 37' to turn rotor 38 counterclockwise and open the valve 10.

At the start of the opening stroke of the rotor, valve 70 will close but the built-up pressure fluid in tank 73 will continue to hold relief valve 75 open to keep handle 32 reversed long enough for the rotor to finish its opening stroke. As pressure in tank 73 exhausts through line 71 and an exhaust vent 85 in valve 70, relief valve 75 will close and the remaining pressure in line 78 and piston actuator 79 can exhaust through orifice 86. A check valve 87 in line 71 by-passes orifice 72 to speed up the rate of exhaust.

Referring to FIG. 3, in this embodiment the operation of the hydraulic motor 13 to close the main valve 10 when the control handle 32 is actuated is the same as in FIG. 1, and the handle is actuated by a pressure responsive element 125 which may comprise a piston 141 in a chamber or cylinder 142 between housing sections 143 and 144, similar to piston 41 in chamber 42 in FIG. 1. However, the piston shaft 145 may be of a constant diameter throughout its length.

The abutment sleeve 166 on the piston shaft 145 is positioned so that when the piston 141 is in its normal position as shown, with the piston held by spring 161 against the rear side of chamber 142, the front end cam surface 166' of the sleeve is spaced a slight amount rearwardly of the ball detents 163 biased by springs 164 and back-up adjusting screws 165. In this position the rear end of shaft 145 abuts the plunger of a normally open sleeve valve 170 and holds the valve closed. One side of valve 170 is connected by conduit 171 through a relief valve 172, regulator 173 and filter 174 to line 20. The other side is connected to a pneumatic timing relay valve 175.

When a pressure drop occurs in the pipeline, the pressure differential from lines 24 and 49 on the piston 141 causes it to start moving forwardly and the initial movement of the shaft 145 brings the cam surface 166' of sleeve 166 into abutment with the ball detents 163 which temporarily restrain further movement of the shaft. This initial movement of the shaft is sufficient to release the plunger of valve 170 and open it, thus connecting line 171 to line 176 and through normally open trigger valve 177 to timing relay valve 175 to start it running.

As shown in FIG. 4, timing relay valve 175 has a timing relay cylinder 178 enclosing a spindle 179 having a timing piston 180 on its upper end and a motor piston 181 slidable on its intermediate portion with a timing spring 182 between the piston 180 and an abutment ring 183, and a recycle spring 184 between ring 183 and piston 181. The spindle 179 is operatively connected to detent mechanism 185 which actuates valve 186 to connect line 176 to line 187. The line 176 is connected to the bottom of the cylinder 178.

Application of pressure into the cylinder through line 176 moves piston 181 away from shoulder 181' compressing spring 184 and allowing spring 182 to move piston 180 and spindle 179 upwardly. This forces air from the upper end of cylinder 178 through the variable orifice 188 and line 188' back into the cylinder below the piston 180 at a timed rate. When the piston 180 and spindle have raised sufficiently to actuate the detent mechanism 185 it will open the valve 186 and connect line 176 to line 187. The time period required to open the valve after application of pressure to the cylinder from line 176 may be one minute, for example, and is determined by the size of orifice 188.

This pneumatic timing relay valve is conventional and per se forms no part of the present invention.

When line 176 is connected to line 187 after the time delay period, normally closed valve 189 opens momentarily and connects lines 24 and 49 substantially equalizing the pressure on the piston. If the pressure drop in line 24 during the time delay provided by the timing relay 175 reaches a predetermined value, for example, 20 pounds in a 1 minute delay period, the differential pressure on the piston will snap the sleeve 166 on shaft 145 past the detents 163 and cause the shaft to actuate control handle 32 to close the pipeline valve 13. If the predetermined drop of 20 pounds is not reached during the 1 minute delay, the valve 189 is momentarily opened, as previously described, to substantially equalize the pressure on opposite sides of the piston and return it to neutral starting position.

When the piston is actuated due to the required rate of pressure drop, the forward movement of takeup washer 160 abutting compression spring 161 causes the washer to engage the trigger 190 of normally open valve 177, closing the valve and shutting off flow to the timing valve. A normally open valve 191 is connected into line 49 between the piston and the expansion tank 53, as shown, and this valve is arranged to be actuated by the rotor 38 of hydraulic motor 13 when it reaches the end of its stroke in closing pipeline valve 10. When valve 191 closes it vents line 49 and allows spring 161 to return the piston to neutral position, while holding pressure in expansion tank 53. The pressure fluid in the expansion tank is prevented from returning to line 24 by the check valve 192.

The lost motion space between handle 32 and piston shaft 145 allows manual operation of the handle to reverse flow through control valve 16 and rotate the rotor 38 to reopen the valve 10. As the rotor starts to reversely rotate the valve 191 is opened, connecting expansion tank 53 to line 49 and substantially equalizing pressure on opposite sides of the piston.

An automatic reopening system similar to that shown in FIG. 2 may, if desired, be applied to the embodiment of FIG. 3.

It is to be noted that in all the embodiments of FIGS. 1, 2 and 3 a restricted orifice times the rate of differential pressure increase on the piston due to the rate of pressure drop in the pipeline, so as to cause movement of the piston when a predetermined amount of pressure drop occurs in a predetermined period of time. In the embodiments of FIGS. 1 and 2 the orifice 51 performs this function and in the embodiment of FIG. 3 the orifice 188 of the timing relay performs the same function.

I claim:

1. A pipeline control for operating the main valve in a pipeline in response to a predetermined pressure drop in a predetermined period of time, comprising a pressure movable element having a shaft, conduits connecting the pipeline to opposite sides of said element normally to hold it in neutral position, control means actuatable by movement of said element to operate said main valve, a pressure tank connected to one of said conduits to create a pressure differential on said element when a drop in pressure occurs in the pipeline, orifice means timing the rate of differential pressure increase on said element due to pressure drop in the pipeline, an equalizing valve to connect said conduits and restore balanced pressure to said element, a cam surface on said shaft, a spring-biased detent radially engaging said cam surface for exerting a predetermined amount of restraining force on the movement of said element by differential pressure on opposite sides thereof, and a timing relay to open said equalizing valve if said detent does not release said shaft in a predetermined period of time after initiation of a pressure differential on said element.

2. A pipeline control as defined in claim 1, in which the detent is a restraining means which permits a slight initial movement of said pressure movable element when a pressure differential is applied thereto insufficient to release the detent, and the timing relay is started by said initial movement.

3. A pipeline control as defined in claim 2, in which a starting valve is connected to said timing relay and said valve is operatively connected to said pressure movable element to open in response to said slight initial movement thereof.

4. A pipeline control as defined in claim 3, in which a shutoff valve normally connects the starting valve to said timing relay and is closed by movement of the pressure movable element when the restraining force of the detent is overcome.

* * * * *